(No Model.)
E. FOWLER.
CORN HARVESTING MACHINE.
No. 580,388. Patented Apr. 13, 1897.
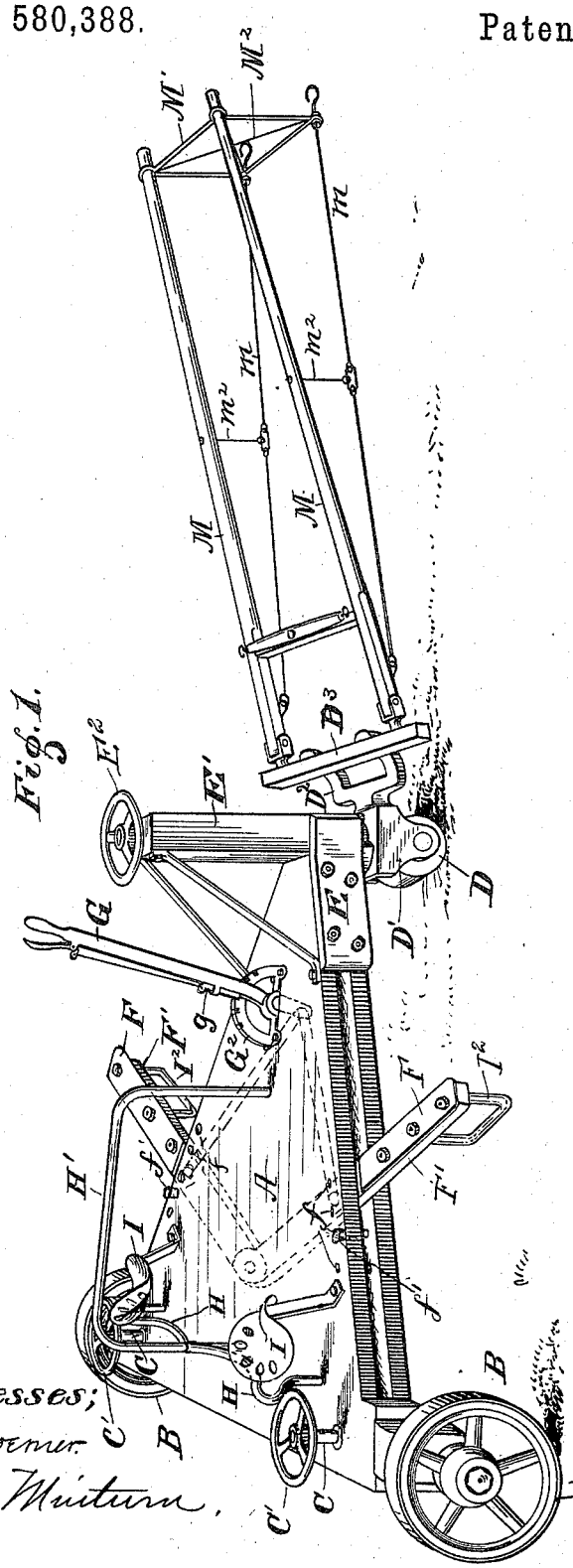
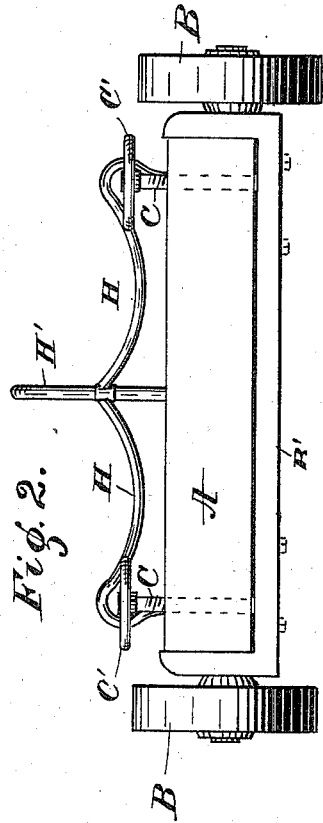
Witnesses:
F. W. Noemer.
L. A. Minturn.
Inventor,
Edward Fowler,
By Joseph A. Minturn,
Attorney.

UNITED STATES PATENT OFFICE.

EDWARD FOWLER, OF WHITESTOWN, INDIANA, ASSIGNOR TO JOHN T. CASEY, L. E. WOODARD, AND J. F. WOODARD, OF SAME PLACE.

CORN-HARVESTING MACHINE.

SPECIFICATION forming part of Letters Patent No. 580,388, dated April 13, 1897.

Application filed August 5, 1895. Serial No. 558,255. (No model.)

*To all whom it may concern:*

Be it known that I, EDWARD FOWLER, a citizen of the United States, residing at Whitestown, in the county of Boone and State of Indiana, have invented certain new and useful Improvements in Corn-Harvesting Machines; and I do hereby declare the following to be a full, clear, and exact description of the invention, such as will enable others skilled in the art to which it appertains to make and use the same.

This invention relates to improvements in machines for harvesting corn, and to that particular class of machines which has for its object the cutting of the stalks of corn to make "fodder" and the gathering of the stalks together into bunches preparatory to being formed into a shock.

I accomplish the objects of the invention by the mechanism illustrated in the accompanying drawings, in which—

Figure 1 is a view in perspective of my complete harvester, and Fig. 2 is a rear elevation.

A represents the body of the machine, which will consist of a triangular frame floored with boards in any suitable manner. The base of the triangle will be toward the rear and will be supported by the two wheels B. The wheels B are mounted on an axle B', which is cranked downwardly, so as to allow the platform to fit into the cranked portion. Vertical screws C, provided with hand-wheels C', furnish means for raising and lowering the platform above the axle.

The front end of the platform will rest on a single wheel D, which will be mounted in a cast-iron frame D', the axle of the wheel D passing through the hangers on each side of the wheel.

$D^2$ is a front extension of the frame D', to which the cross-bar $D^3$, for the attachment of the shafts, is fastened.

E is a head-block which is bolted to the front of the platform and has the vertical extension or post E'. This post is provided with an under side opening, wherein is located a means (not illustrated) for raising and lowering the front end of the platform, the adjusting of the platform being accomplished through the medium of hand-wheel $E^2$.

F are the knives for cutting the cornstalks, and are two in number, arranged one on each side of the machine. The knives are bolted to the horizontal adjustable bars F'. The bars F' are pivoted at their inner ends to the under side of the body of the machine and have a horizontal swinging adjustment.

G is a hand-lever for opening out and closing the knife-bars. A suitable slot in the side of the body will allow the knives to be drawn in under the platform and fully protected. A series of holes $f$ will be provided along the sides of the platform, into which the pins $f'$, to form stops for the bars, will be inserted, whereby the bars can be stopped at any desired angle.

$G^2$ is a rack-bar, and $g$ a dog secured to the lever and working into the notches in the bar and enabling the lever to be locked at a desired position.

Two rows of corn will be cut at once, and as the corn is cut the stalks will be guided back and deposited in a horizontal or reclining position upon the platform. The reclining position being acquired by providing the transverse bars H is preferable, because it enables the operator's arm to be passed under the bar and around the bundle of corn, thereby facilitating the handling of the stalks. The bars will be depressed in the middle to form a pocket to receive the stalks as they are cut. H' is a guide to assist in directing the stalks into position.

I are seats which will be occupied by operators, one for each seat, and $I^2$ are foot-rests secured to the cutter-bar. These rests are here shown as depending stirrups, but they may be of any construction that will serve as supports for the feet of the operators and enable the operators to maintain a certain control over the bars. The seats I are placed near the edge of the platform and face out, so the operators will be in position to guide the cornstalks as fast as they are cut back onto the platform upon the bars H, where they are collected into a bunch, which, when of requisite size, will be lifted off of the machine by the operators and placed in a shock in the usual manner. The closeness of the seats to the edges of the platform makes it necessary to provide rests for the operators' feet. I² are these rests, and their location places the operators in the best attainable position to handle the stalks as they are cut.

As this machine is designed to cut two rows of corn at each passage across the field, it will be found most convenient to have the horses for pulling it attached so as to travel between the rows of corn being cut, and as two horses will as a rule be required to move the machine readily I will provide means for hitching them tandem, in order that they may both follow conveniently between the same rows. The shafts M will be secured to the cross-bar D³ in the usual manner, and the draft-bars $m$ will be secured, by means of a hinge-joint, to the shafts close to the junction of the shafts with the cross-bar D³. A rectangular removable frame M' will join the front ends of the shafts together and will also connect the front ends of the draft-bars $m$ with each other and with the ends of the shafts in the manner as shown in Fig. 1. Diagonal braces M² will render this frame rigid. The draft-bars $m$ will preferably be in two sections, joined together by means of a link which passes through eyes in the two ends to be united. This will give the necessary flexibility of the bars, and to prevent buckling and lateral movement the bars will be connected with the shafts by means of the standards $m^2$.

The front horse will be hitched to the hooks on the front ends of the bars $m$.

Having thus fully described my invention, what I claim as new, and wish to secure by Letters Patent of the United States, is—

In a corn-harvesting machine the combination with the machine, of the shafts M having the draft-bars $m$ hinged to the base of the shafts and supported at their front ends by means of the rectangular frame M' and at the middle by the hangers $m^2$.

In testimony whereof I affix my signature in presence of two witnesses.

EDWARD FOWLER.

Witnesses:
JOSEPH A. MINTURN,
J. T. CASEY.